United States Patent [19]

Burke et al.

[11] Patent Number: 4,770,458
[45] Date of Patent: Sep. 13, 1988

[54] UTILITY RACK FOR PICKUP TRUCK

[75] Inventors: Steven R. Burke, Huntington Beach; Leonard N. Albrecht, Irvine, both of Calif.

[73] Assignee: William S. Tokarsky, El Toro, Calif.

[21] Appl. No.: 37,165

[22] Filed: Apr. 16, 1987

[51] Int. Cl.[4] ............................................. B60P 3/00
[52] U.S. Cl. ................................. 296/3; 224/42.45 R
[58] Field of Search ........................... 296/3, 102, 26; 224/42.45 R

[56] References Cited

U.S. PATENT DOCUMENTS

| | | | |
|---|---|---|---|
| 4,057,281 | 11/1977 | Garrett | 296/3 |
| 4,138,046 | 2/1979 | DeFreze | 296/3 |
| 4,267,948 | 5/1981 | Lewis | 296/3 |
| 4,405,170 | 9/1983 | Raya | 296/3 |
| 4,565,402 | 1/1986 | Hopkins | 296/3 |
| 4,659,131 | 4/1987 | Flournoy, Jr. | 296/3 |

Primary Examiner—Robert R. Song
Attorney, Agent, or Firm—Allan R. Fowler

[57] ABSTRACT

A utility rack for a pickup truck includes front and rear stanchions, each generally in the shape of an inverted "U", and left and right side rails extending between hinges at the upper corners of the stanchions. The front stanchion is permanently mounted at the front of the truck bed. The rear stanchion is movable between an extended position at the rear of the truck bed and a proximate position just behind the front stanchion. The side rails collapse vertically into a "V" (seen from the side) as the rear stanchion is moved to its proximate position, giving the rack an overall appearance of an "M". When the rack is fully collapsed, it looks like an "I".

In one version, a second pair of rails extends over the cab, vertically rotating on a second pair of hinges on the front stanchion. A cross member joins the front ends of these rails.

In another version, the side rails are not mounted onto the stanchions by hinges, but by removable brackets; and the rails collapse horizontally rather than vertically. The over-cab rails are continuations of the side rails. The over-cab cross member can be divided in the middle, and its component parts swung horizontally along side the side rails.

In all versions, the stanchions and cross members can be telescoped to fit differing widths of truck bed.

16 Claims, 6 Drawing Sheets

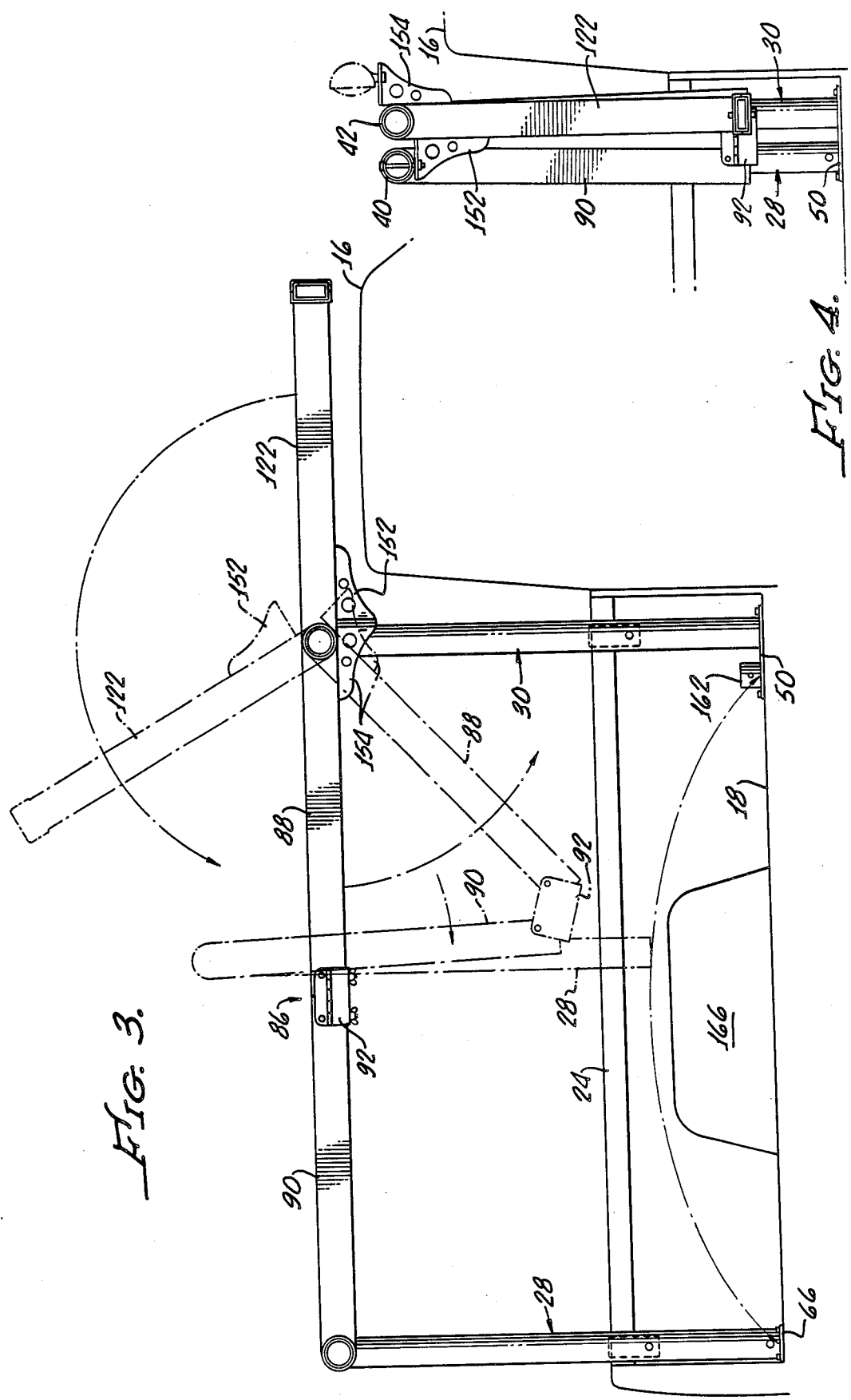

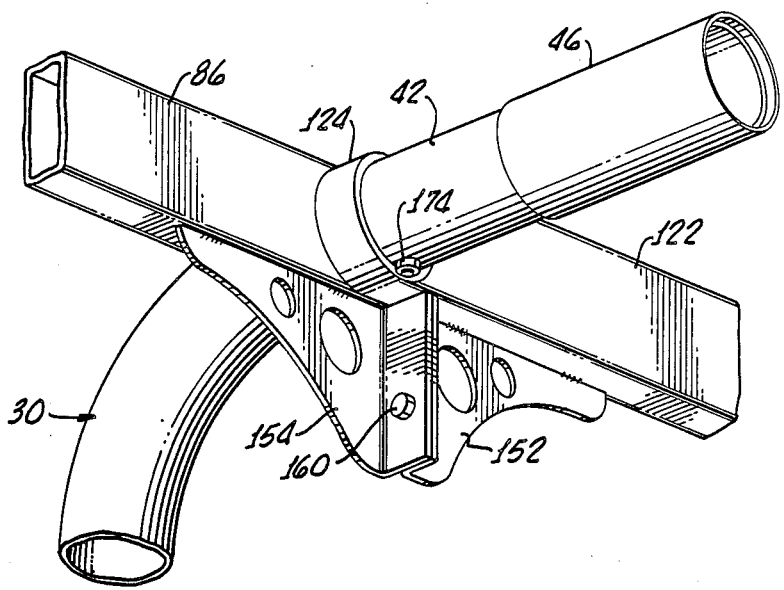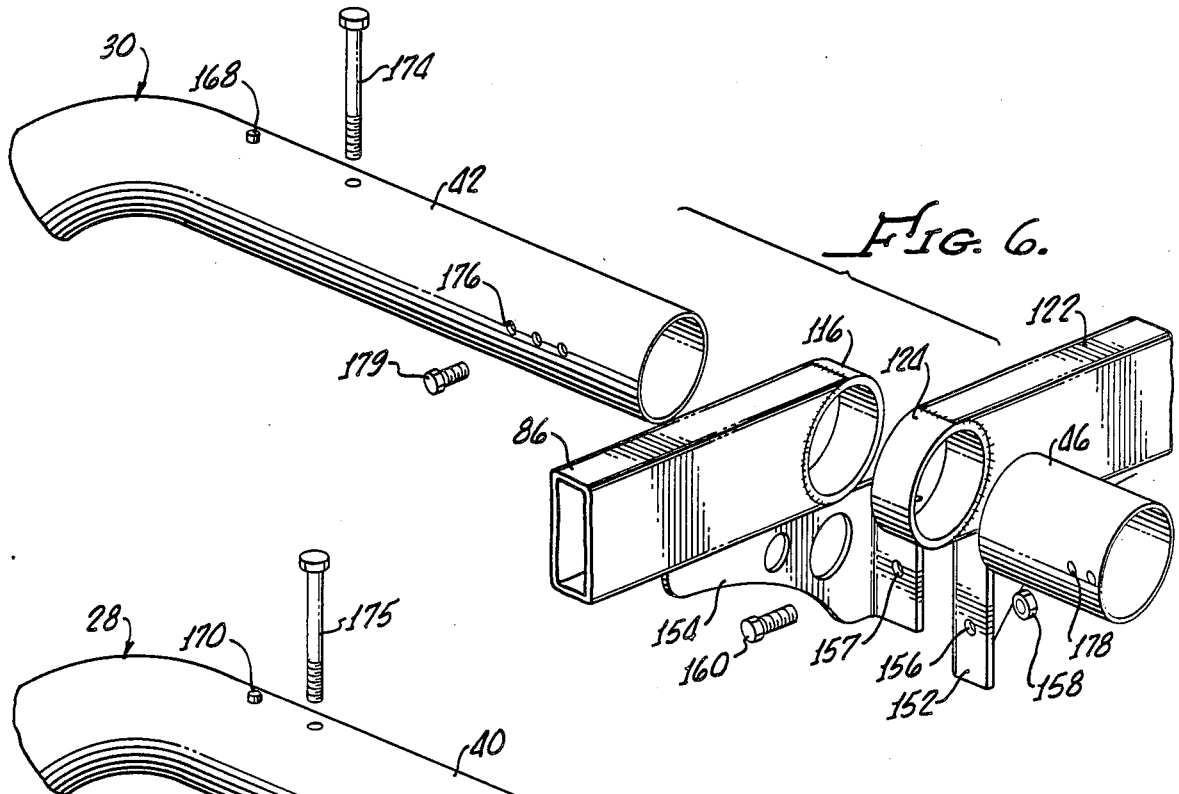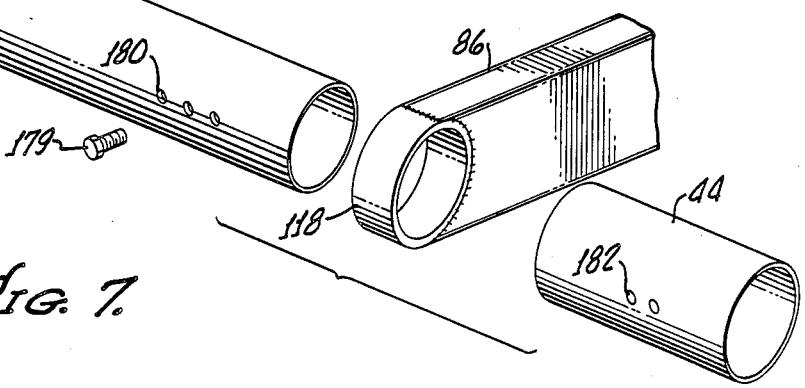

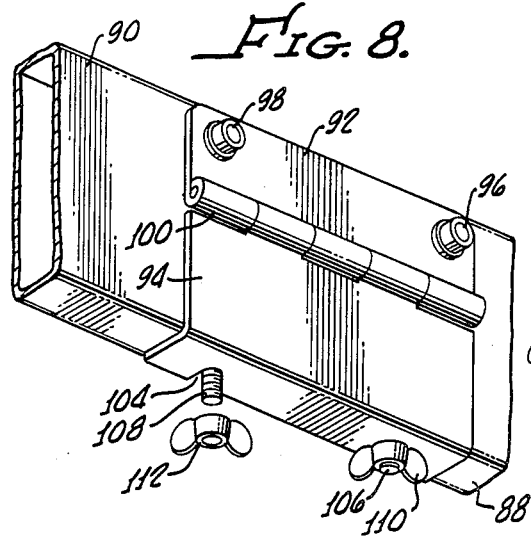
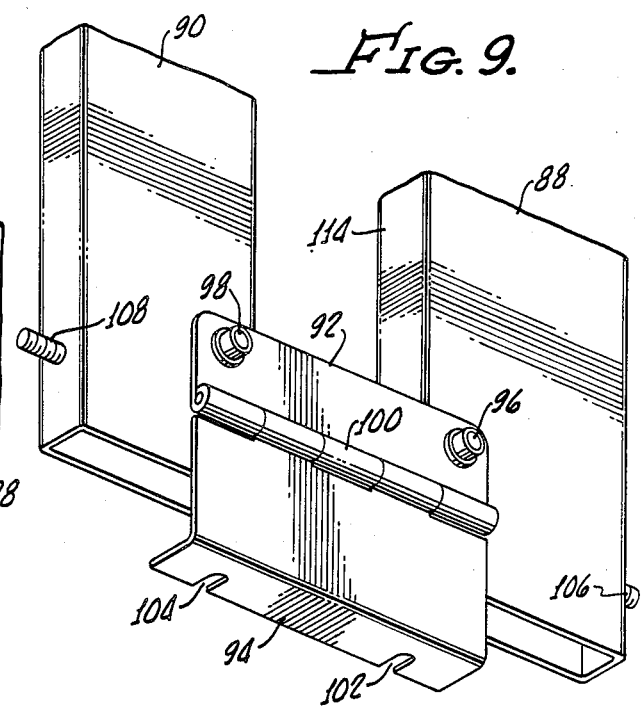
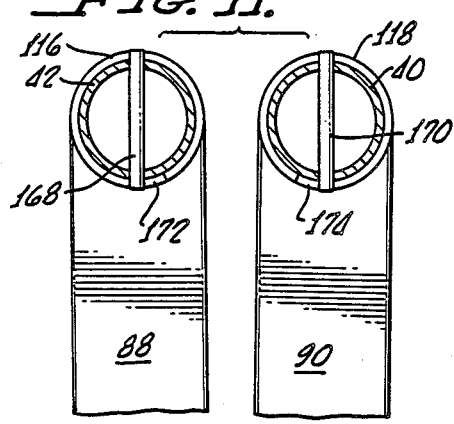
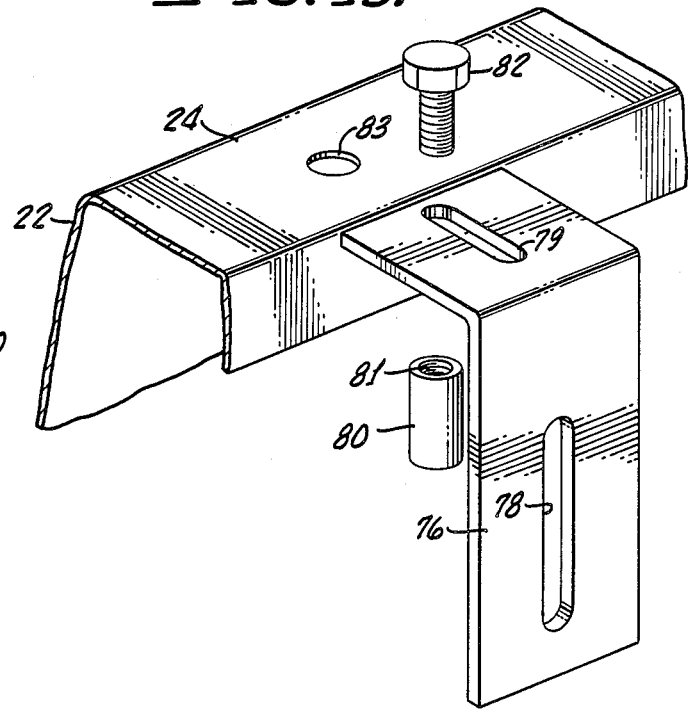
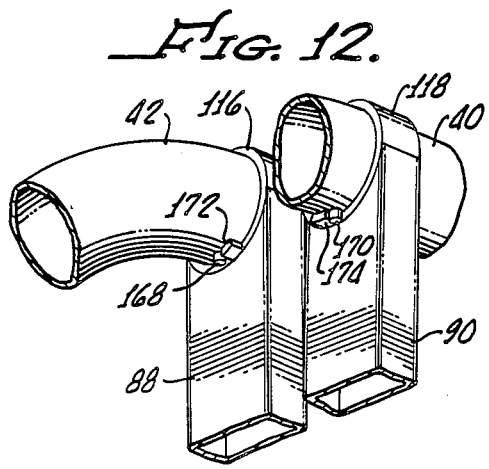

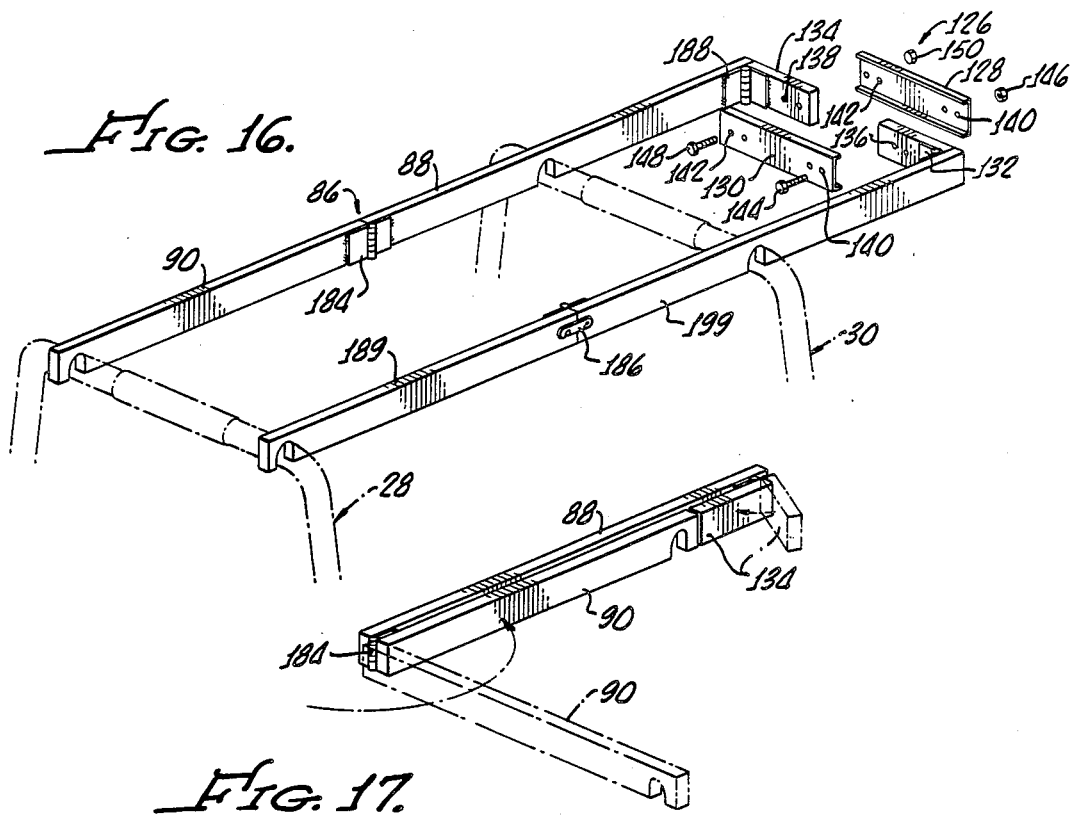
FIG. 16.
FIG. 17.
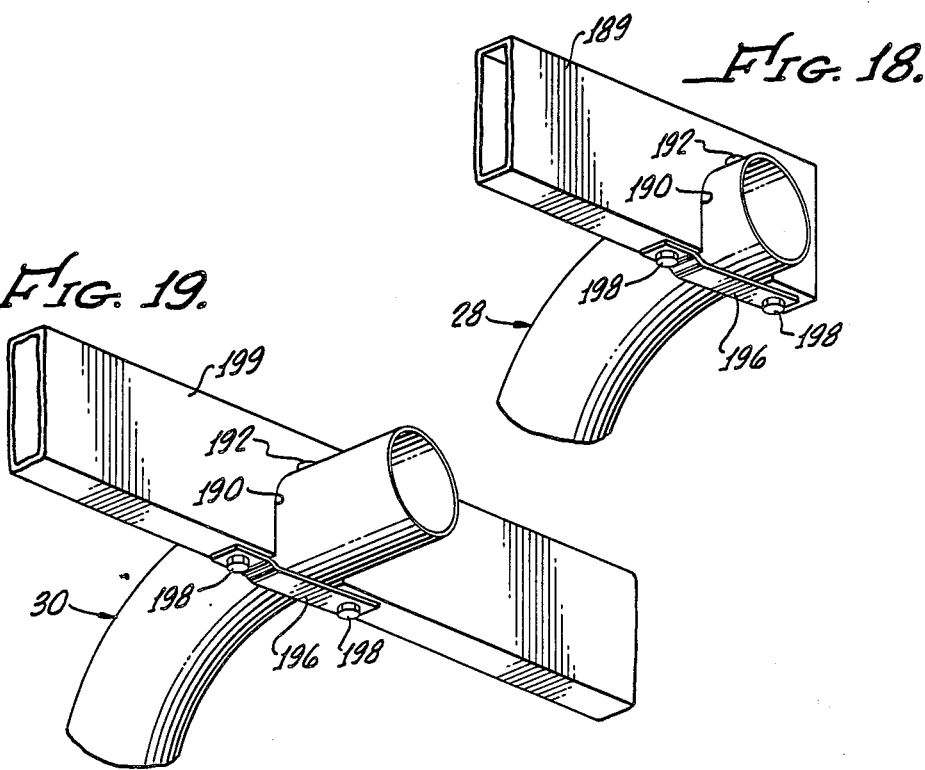
FIG. 18.
FIG. 19.

UTILITY RACK FOR PICKUP TRUCK

This invention relates to truck racks, and more specifically has reference to elevated utility racks adapted to fit over the bed of a pickup truck.

Typically, a pickup truck has a cab and a cargo bed disposed rearward of the cab. The bed in turn has a floor, a lateral front wall, right and left longitudinal side walls, and a rear tailgate. For more conveniently carrying specialty items such as ladders, pipes, sheet rock, sheets of plywood, etc., pickup trucks have been outfitted with various utility racks for supporting such cargo in an elevated position above the bed of the truck. As used herein, such racks are generally referred to at times as overhead or elevated utility racks.

Pickup trucks were originally designed essentially as utility vehicles. However, they have become quite popular as passenger vehicles of general use where appearance is considered an important factor, while also maintaining the capability of a utility truck function.

Conventional utility racks generally detract from the truck's appearance as a passenger vehicle, and, since they are removable only with considerable difficulty and require significant storage space, as a practical matter they are left in place on the truck or never installed to begin with. While removable and/or collapsible utility racks have been proposed, the same problem still exists, although perhaps to a reduced degree.

Accordingly, it is an object of the present invention to provide a utility rack for pickup trucks which is pleasing in appearance when conveniently moved to a closed position adjacent the front wall of the truck bed, thus residing adjacent the cab of the truck.

A further object of the present invention is to provide for movement to such closed position in order to free the bed space of the truck from obstruction for utility purposes.

In accordance with the present invention, the utility rack includes a front and a rear stanchion, each stanchion being shaped generally in the form of an inverted "U", and having right and left legs extending downwardly from a cross member. Means are provided for mounting the right and left legs of the front stanchion to the pickup truck bed floor respectively adjacent the intersection of the bed front wall with the right and left side walls of the bed. Means are provided for detachably mounting the right and left legs of the rear stanchion to the bed floor respectively adjacent the intersection of the tailgate with the right and left side walls of the bed, thereby mounting the rear stanchion in an open or extended position; and, means are provided for detachably mounting the right and left legs of the rear stanchion to the bed floor respectively adjacent, but behind, the right and left legs of the front stanchion, thereby mounting the rear stanchion in a closed or proximate position or configuration. Right and left longitudinal side rails are provided, together with means for mounting the respective rails to the cross members of the stanchions.

In a preferred embodiment of the invention, the front and rear stanchions are configured to resemble a double "roll bar" when the rear stanchion is moved to the proximate or closed position.

In this regard, the front and rear stanchions are of substantially the same size, shape and construction, and each of the right and left legs rises vertically from the floor until adjacent the gunwale of the respective side wall, then bows outboard over said gunwale, then inclines inboard to a point adjacent the respective outboard upper portion of the cab, where it joins the cross member of the respective front or rear stanchion. This cross member is adjustable by telescoping means.

Also in a preferred embodiment of the invention, the side rails are collapsible and each comprises front and rear portions and means for releasably connecting said front and rear portions into a rigid longitudinal rail.

The right and left side rails are mounted to the cross members of the stanchions by means which allow rotational movement of the front and rear portions of each rail in a vertical longitudinal plane, and are mounted sufficiently inboard of the respective stanchion legs that, in the collapsed configuration, the collapsed rails nest between the legs of the stanchions.

In the preferred embodiment of the invention, there are also longitudinal right and left over-cab rails which are mounted to the cross member of the front stanchion, inboard of the respective side rails, by respective over-cab hinge means which allow rotation of the over-cab rails in a vertical longitudinal plane. In an extended configuration, they extend forwardly from the front stanchion's cross member, adjacent its intersections with the front stanchion's legs. In a collapsed configuration, they extend vertically downwardly from the same part of the front stanchion's cross member.

An over-cab cross member is mounted to, and extends between, the ends of the over-cab rails distal from the front cross member. This over-cab cross member is adjustable by telescoping means, the same as the stanchion cross members.

An over-cab stop is mounted on the underside of the end of each over-cab rail next to the cross member of the front stanchion. Likewise, the side rails each have a side rail stop mounted on the underside of the side rail next to the cross member of the front stanchion. Thus, when the over-cab rails and side rails are in the extended configuration, the side rail stops engage the over-cab stops and thereby maintain the over-cab rails in this configuration.

The above and other important objects and features of the invention will be better understood from the following detailed description of a preferred embodiment of the invention, made with reference to the accompanying drawings, in which:

FIG. 3 is a side elevation of the same rack when mounted in its extended configuration, showing intermediate positions while being collapsed;

FIG. 4 is a side elevation of the same rack when mounted in its collapsed configuration;

FIG. 5 is detailed perspective view, seen from inboard, beneath, and behind, of the upper left corner of the front stanchion of the same rack, showing the left over-cab rail stop engaging the left side rail stop in their extended configuration;

FIG. 6 is an exploded view of the apparatus shown in FIG. 5;

FIG. 7 is an exploded view, seen from inboard, above, and behind, of the upper left corner of the rear stanchion of the same rack, showing the left side rail in its extended configuration, and showing the telescoping nature of the rear stanchion's cross member;

FIG. 8 is a perspective view, seen from inboard, beneath, and behind, of the left side hinge locking the front (right) and rear (left) members into a rigid rail;

FIG. 9 is a perspective view of the same hinge when unlocked, allowing the rail to collapse into its members;

FIG. 11 is a cross section, viewed from the left side of the rack, of the left side rail's members and of the cross members of the front (left) and rear (right) stanchions in their collapsed configuration, showing how the member stops engage the stanchion stops and prevent swinging of the members;

FIG. 12 is a perspective view of the same apparatus, seen from outboard, beneath, and behind;

FIG. 15 is a perspective view, partly in phantom line, of a stanchion bracket about to be pinned to a side wall through a hole in its gunwale;

FIG. 16 is a side perspective view of the horizontal-rotation version of the rack, showing, in exploded view, the telescoping nature of the over-cab cross member;

FIG. 17 is perspective view of the left side rail in its collapsed configuration, showing, in phantom line, an intermediate position while being collapsed;

FIG. 18 is a perspective view, seen from inboard, beneath, and ahead, of the right side rail engaging the rear stanchion; and FIG. 19 is a similar perspective view of the right side rail engaging the front stanchion.

Figure 1:
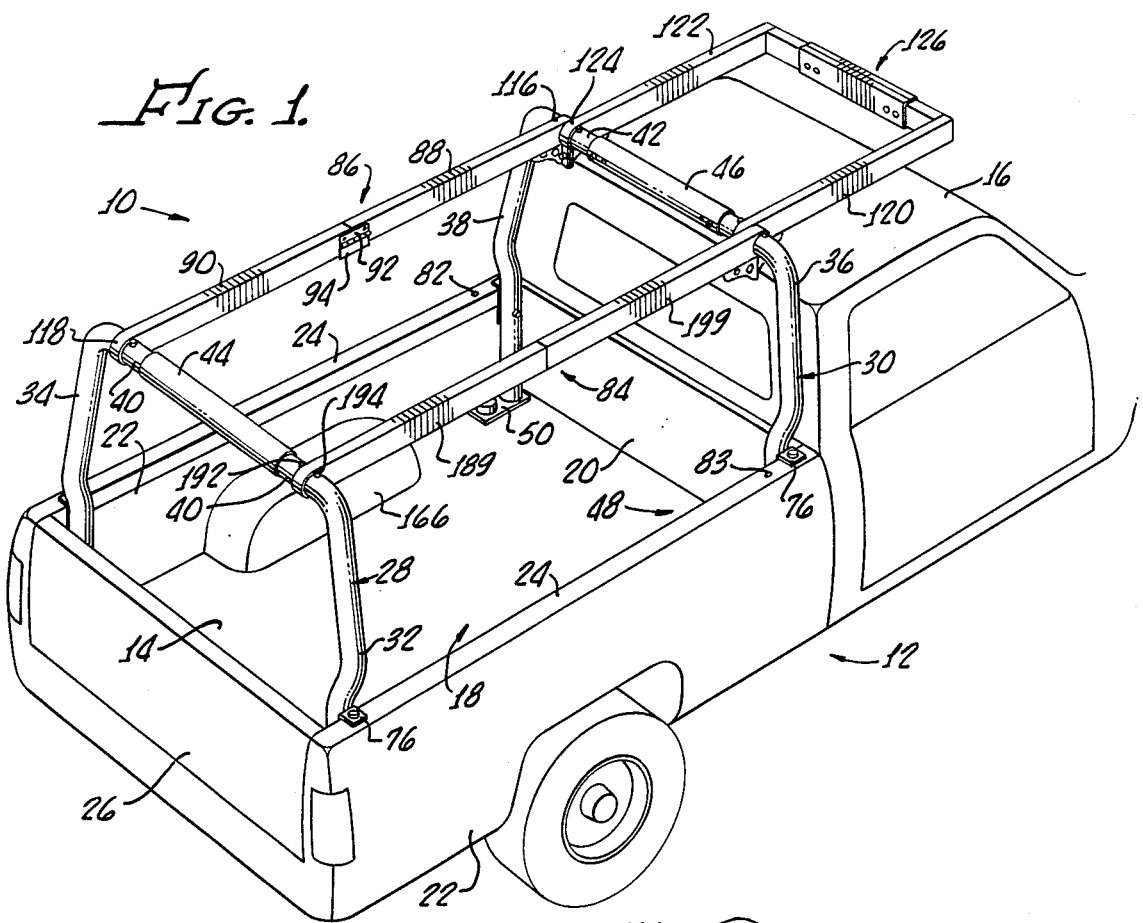
FIG. 1 is a perspective view of the vertical-rotation version of the rack when mounted on the truck in its extended configuration.
Figure 2:
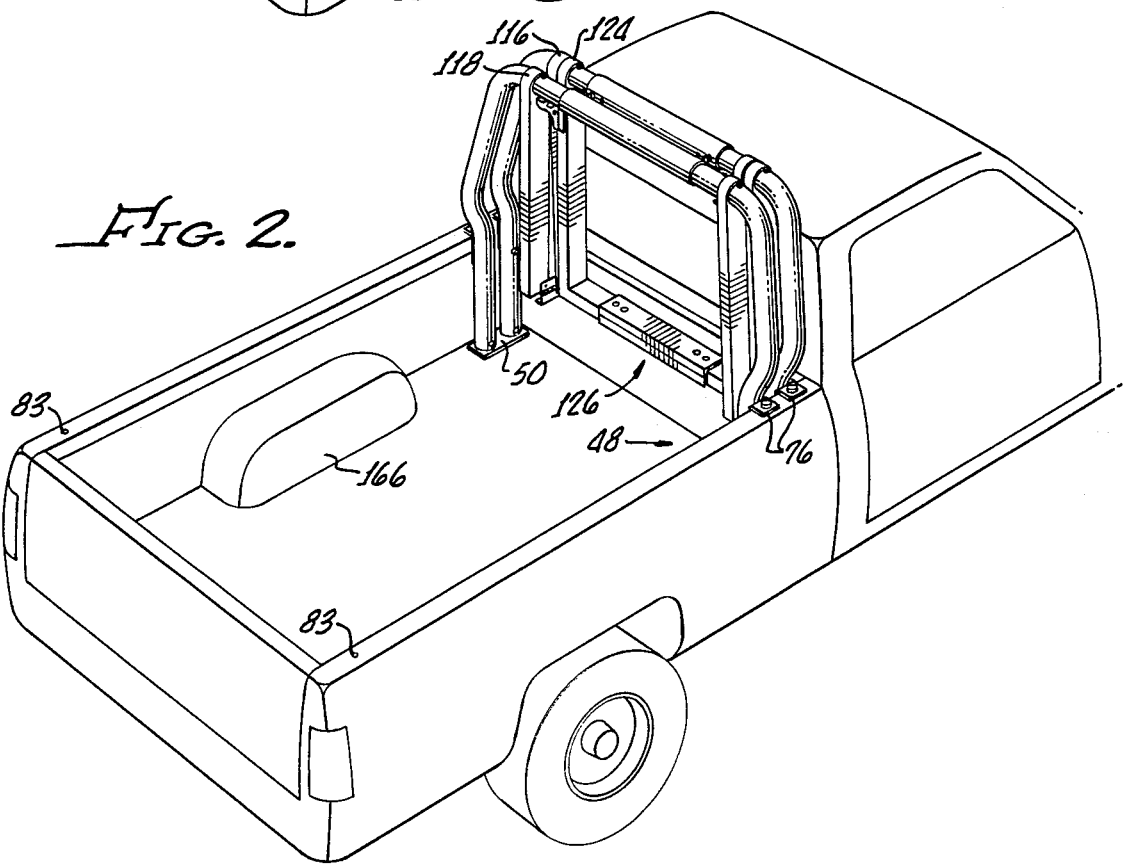
FIG. 2 is a perspective view of the same rack when mounted on the truck in its collapsed configuration.

Turning now to FIGS. 1 and 2 of the drawings, the rack 10 fits onto a pickup truck 12 having a bed 14 and a cab 16. The bed has a floor 18, a front wall 20, left and right side walls 22 with gunwales 24, and a tailgate 26. The rack 10 comprises a tubular rear stanchion 28 and a tubular front stanchion 30. The two stanchions 28, 30 have legs 32, 34, 36, and 38. The legs 32, 34 of the rear stanchion 28 support that stanchion's cross member 40. The legs 36, 38 of the front stanchion 30 support that stanchion's cross member 42. The rear stanchion's cross member 40 includes a telescoping member 44. The front stanchion's cross member 42 includes a telescoping member 46. The front and rear stanchions 28, 30 are identical, except for their mounting, and the left side of each is the mirror image of the right. Indeed, the left side of the entire rack 10 is the mirror image of the right.

The front stanchion's right leg 36 is mounted to the right front corner of the floor 18 by a mounting plate 48. Its left leg 38 is likewise mounted to the left front corner of floor 18 by a left front mounting plate 50. As the mounting apparatus on the right side is the mirror images of that on the left, only that on the left will be described in detail.

Figure 13:
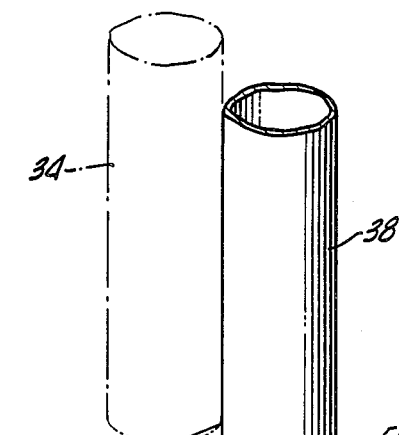
FIG. 13 is an exploded view of a front mounting plate, showing a rear stanchion leg about to be mounted onto same.

As is best shown in FIG. 13 for the left front corner, this mounting is conveniently accomplished by use of bolts 52. Each bolt engages a slot 54 in the left front mounting plate 50, rather than a hole, so that the left front mounting plate 50 may be bolted to the raised portions 56 of the floor 18, as close as practicable to the side wall 22. These raised portions 56 have a center-to-center separation 58 which may vary from truck 12 to truck 12, and may not equal the separation between mounting plate holes.

The left leg 38 of the front stanchion 30 is mounted by a welding means 60 to the left front mounting plate 50. The left leg 34 of the rear stanchion 28, however (shown in phantom line), is mounted (in its proximate position) to the left front mounting plate 50 by a cylindrical mounting member 62 which is an integral part of the left front mounting plate 50. Mounting member 62 has a bolt hole 64 extending transversely therethrough, approximately half way up the side of the mounting member 62.

Figure 14:
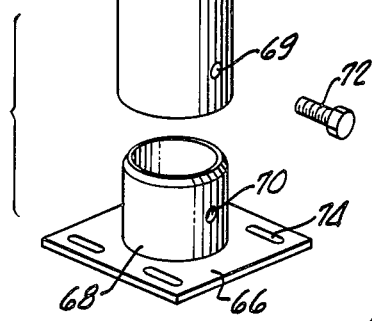
FIG. 14 is an exploded view of a rear mounting plate, showing a rear stanchion leg about to be mounted onto same.

As is best shown in FIG. 14 for the left rear corner, the left leg 34 of the rear stanchion 28 is mounted (in its extended position) to the left rear mounting plate 66 by means of a mounting member 68. Mounting member 68 is identical to the mounting member 62 of the front plate 50, and is an integral part of mounting plate 66. The leg 34 includes a bolt hole 69 extending transversely therethrough which aligns with a bolt hole 70 in the rear mounting member 68 when the leg 34 is resting on the mounting plate 66. A retaining bolt 72 retains the leg 34 in its position on rear mounting member 68, and is also used to retain the leg 34 when it is on front mounting member 62. Both rear mounting member 68 (FIG. 14) and front mounting member 62 (FIG. 13) are sized so that they may be closely received by the tubular leg 34 of the rear stanchion 28. The rear mounting plate 66 uses slots 74 the same as the slots 54 of the front plate 50, and for the same reason.

Returning to FIGS. 1 and 2, the outboard edge of each stanchion 28, 30 has an L-shaped bracket 76 bolted to it by means of a slot 78 on the vertical leg of the bracket 76 (see FIG. 15). The horizontal leg of the bracket 76 includes a transverse slot 79, from which a pin 80 protrudes downward. The pin 80 includes internal threads 81 at its upper end, and is retained in the slot 79 by a bolt 82 which engages the threads 81 of the the pin 80. This pin 80 engages the closest side wall 22 through a hole 83 in the gunwale 24 of the side wall 22. Setting a stanchion 28 (temporarily) or 30 (permanently) into a mounting plate 48, 50 sets the pin 80 into the gunwale hole 83.

The horizontal bracket slot 79 is used rather than a horizontal bracket hole, because the separation between legs 36, 38 is dictated by the telescoping member 46, which can be adjusted to the width of the bed 14 only approximately, while the bracket 76 must fit the gunwale 24 exactly; a moveable pin 80 accomplishes this result. Likewise, a vertical bracket slot 78 is used rather than a vertical bracket hole, because the height of the gunwale 24 will vary from bed 14 to bed 14, while the height of the hole in the stanchion 28, 30 to which the bracket 76 is bolted will not vary.

Right and left side rails 84, 86 extend longitudinally from the rear stanchion's cross member 40 to the front stanchion's cross member 42. As with the mounting plates 48, 50, only the left side rail 86 will be described in detail, as the right side rail 84 is its mirror image.

The left side rail 86 is a rectangular tube, and is substantially in the vertical plane defined by left front mounting plate 50 and left rear mounting plate 66. It includes a front member 88, a rear member 90, a side hinge 92, and lock means 94.

As best seen in FIGS. 8 and 9, the side hinge 92 is a plate mounted on the inboard surfaces of members 88, 90 by transverse bolts 96, 98, on which members 88, 90 may rotate in a vertical longitudinal plane. A second plate (not shown) may be mounted on the outboard surfaces of members 88, 90 by the same transverse bolts 96, 98 to provide additional strength.

The lock means 94 is a separate plate attached by a longitudinal hinge 100 to the bottom of the side hinge 92. Its bottom is bent at right angles immediately under the bottom of the members 88, 90, thereby combining them into a rigid longitudinal rail 86. Slots 102, 104 are cut into the bent-under portion of the lock means 94, and engage bolts 106, 108, which protrude from the bottom of members 88, 90. Wing nuts 110, 112 retain the lock means 94 onto the bolts 106, 108. The top surface 114 of the rail 86 retains its smooth character, since the hinge 92 is on the side or sides of the rail 86, and the lock means 94 is on its inside and bottom.

In the vertical-rotation version of the rack (FIGS. 1–15), the side rails 86 are mounted to the front stanchion 30 (FIGS. 5–6) and rear stanchion 28 (FIG. 7) by stanchion hinge means 116, 118. Each of these stanchion hinge means 116, 118 is a right annular cylinder whose internal diameter is sized to closely receive the external diameter of the cross member 40, 42 of the stanchion 28, 30. Its external diameter is the height of the rail 86, and its height is the width of the rail 86. Each cross member 40, 42 penetrates the respective stanchion hinge means 116, 118, and its axis forms the axis of rotation of the respective side rail member 88, 90.

Figure 10:
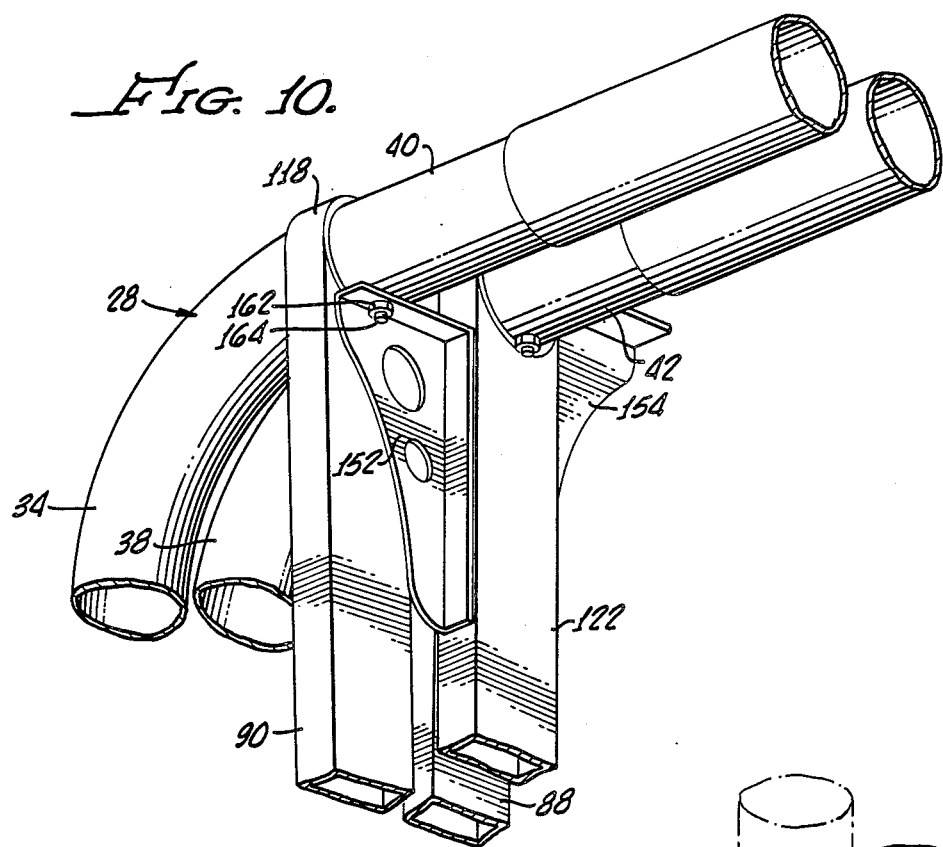
FIG. 10 is detailed perspective view, seen from inboard, beneath, and behind, of the upper left corners of the front and rear stanchions of the same rack, showing the left over-cab rail and side rail in their collapsed configuration.

As is best seen in FIGS. 2 and 10, the stanchion hinge means 116, 118 are mounted on the cross members 40, 42 sufficiently inboard of the legs 34, 38 as to cause side rail members 88, 90 to nest inboard of them when in the collapsed configuration.

Referring to FIGS. 1, 2, 5, and 6, right and left over-cab rails 120, 122 are mounted onto the cross member 42 of the front stanchion 30. Again, as the right over-cab rail 120 is the mirror image of the left over-cab rail 122, only the left over-cab rail 122 will be discussed in detail.

The over-cab rail 122 has a cross section which is identical to that of the side rail 86. It is mounted to the cross member 42 by a hinge means 124 identical to the hinge means 116 of the side rail 86. The over-cab hinge means 124 is inboard of the side rail hinge means 116. In the extended configuration (FIGS. 1 and 5), the over-cab rail extends over the cab 16 of the truck 12. In the collapsed configuration (FIGS. 2 and 10), it nests vertically inboard of the side rail 86.

An over-cab cross member 126 extends between the front ends of the over-cab rails 120, 122 when in the extended configuration (FIG. 1). In the collapsed configuration (FIG. 2), it hangs from the over-cab rails 120, 122 just above the floor 18 of the bed 14, near the front wall 20. Its cross section, like that of the over-cab rail 122, is identical to that of the side rail 86.

The over-cab cross member 126 is adjustable by means of a two part telescoping member 128, 130 (FIG. 16), which bolts onto right and left portions 132, 134 of the cross member 126. Evenly spaced longitudinal holes 136 in portion 132 are matched by evenly spaced longitudinal holes 138 in portion 134, thereby allowing the two part telescoping member 128, 130 to be symmetrically bolted through these longitudinal holes 136, 138 by likewise evenly spaced and symmetric longitudinal holes 140, 142, using a right bolt 144 and nut 146 and left bolt 148 and nut 150.

At the front stanchion's cross member 42, an over-cab rail stop 152 (FIGS. 5 and 6) is mounted on the underside of the over-cab rail 122. It engages a side rail stop 154 mounted on the underside of the side rail 86, also at the front stanchion's cross member 42. As the over-cab hinge means 124 is somewhat inboard of the side rail hinge means 116, the side rail stop 154 protrudes inboard a like distance to fully engage the over-cab rail stop 152.

The over-cab rail stop 152 has a bolt alignment hole 156, which is aligned with a similar bolt alignment hole 157 in the side rail stop 154 when the over-cab and side rails 122, 86 are in their extended configuration (FIGS. 5 and 6). In that configuration they are joined by a nut 158 and bolt 160.

As the rack 10 is collapsed (FIG. 3), the side rail's front member 88 rotates downward through 90 degrees. This rotates the side rail stop 154 (formerly protruding downward) forward through 90 degrees. It then protrudes forward from the front stanchion's cross member 42 (FIG. 2). The over cab rail 122, however, rotates first upward, then backward, and then downward through a total of 270 degrees. This rotates the over-cab rail stop 152 (also formerly protruding downward) first forward, then upward, and then backward through a total of 270 degrees. It then protrudes backward from the front stanchion's cross member 42 and under the rear stanchion's cross member 40 (FIG. 4).

This aligns the over-cab rail stop bolt alignment hole 156 to a point directly under the cross member 40 of the rear stanchion 28 (FIG. 10), where it may be bolted to the rear stanchion's cross member 40 by a nut 162 and bolt 164. The bolt 164 traverses the entire height of the cross member 40 by means of bolt alignment holes (not shown) at the top and bottom of the cross member 40.

When collapsing the rack 10 (FIG. 3), the over-cab rail 122 is first rotated backward through 270 degrees. The hinge means 92 is unlocked, and the rear stanchion 28 is unbolted from the rear mounting plate 66. The floor 18 of the bed 14 is interrupted by two wheel wells 166. The rear stanchion 28 is therefore lifted over these wheel wells 166 as it is moved forward to the front mounting plate 50.

Setting the rear stanchion 28 down onto and around the mounting member 62 (FIG. 13) causes the pin 80 of the bracket 76 (FIG. 15), bolted to the side of the rear stanchion 28, to engage the hole 83 in the gunwale 24 of the side wall 22, thereby stabilizing it. It further causes the cross member 40 to rest upon the over-cab rail stop 152, allowing them to be bolted together (FIG. 10).

Turning to FIGS. 11 and 12, the side rail's front member 88 and rear member 90, when hanging in the collapsed configuration from the front stanchion's cross member 42 and rear stanchion's cross member 40, tend to swing rearward every time the tuck 12 is accelerated, and frontward every time it is braked. To prevent this, anti-swing pins 168, 170 vertically traverse the cross members 42, 40, and protrude from the bottom thereof, just outboard of the front and rear members 88, 90. Mounted on the outboard edge of the hinge means 116, 118 are stops 172, 174 which engage these anti-swing pins 168, 170, but only on one side of members 88, 90.

The front stop 172 prevents the front member 88 only from swinging forward. If it also prevented it from swinging rearward. it would be impossible to rotate the front member 88 to its extended configuration. What prevents the front member 88 in its collapsed configuration from swinging backward from the front stanchion's cross member 42 is the fact that it is joined to the rear member 90 at its other end. Rotating the front member 88 backward would rotate the rear member 90 backward with it, and the rear stop 174 prevents this. The rear stop 174 governs the motion of the rear member 90 in a front-to-rear mirror image fashion.

The anti-swing pins 168, 170, being immediately outboard from the front and rear members 88, 90, also retain the front and rear members 88, 90, preventing them from slipping laterally outboard along the cross members 40, 42. Inboard slippage is prevented by the bolts 174, 175 (FIGS. 6 and 7).

Alignment holes 176, 178, 180, 182 are drilled at regular intervals in the cross members 40, 42 and the telescoping members 44, 46, and fasten these members with bolts 177, 179. The intervals are the same as those of the over-cab cross member 126 (FIG. 16).

As an alternative to the foregoing vertical-rotation version of the rack (FIGS. 1 through 15), a horizontal-rotation version (FIGS. 16 through 19) may also be used. As before, only the left side will be described in detail, the right side being the mirror image thereof.

In this version, there is no separate over-cab rail 122. Instead, the front member 88 continues forward over the cab 16. A hinge 184 mounted on the inboard surfaces of front member 88 and rear member 90 allows these members to collapse horizontally. A latch on the outboard surface, not visible on the left side, but shown as 186 on the right side locks the members into a rigid rail 86.

A similar hinge 188 on the interior surfaces of the left front member 88 and left over-cab cross member 134 allows the left over-cab cross member 134 to likewise collapse horizontally parallel to the front member 88. The sum of the lengths of the rear member 90 and the over-cab cross member 134 is slightly less than the length of the front member 88.

FIG. 18 shows how the right rear member 189 is attached to the rear stanchion 28. A notch 190 is cut into the bottom of rear member 189, and stanchion 28 fits into this notch 190. Retaining pins 192, 194 (see also FIG. 1) on top of the rear stanchion 28, immediately inboard and outboard of the rear member 189, prevent transverse slippage. Vertical movement is prevented by a base plate 196, attached to the underside of the rear member 189 on opposite sides of the notch 190 by means of bolts 198.

FIG. 19 shows the right front member 199 mounted to the front stanchion 30 by identical apparatus.

What is claimed is:

1. A utility rack for a pickup truck, the truck having a cab and a bed disposed rearward of the cab, the bed having a floor, a lateral front wall, right and left longitudinal side walls, and a rear tailgate, said rack comprising:
    (a) a tubular front stanchion shaped generally in the form of an inverted "U", and having right and left legs extending downward from a cross member;
    (b) means for mounting the right and left legs of the front stanchion to the floor respectively adjacent the intersection of the front wall with the right and left side walls;
    (c) a tubular rear stanchion shaped generally in the form of an inverted "U", and having right and left legs extending downward from a cross member;
    (d) means for detachably mounting the right and left legs of the rear stanchion to the floor respectively adjacent the intersection of the tailgate with the right and left side walls, thereby mounting the rear stanchion in an extended position;
    (e) means for detachably mounting the right and left legs of the rear stanchion to the floor respectively adjacent, but behind, the right and left legs of the front stanchion, thereby mounting the rear stanchion in a proximate position;
    (f) right and left longitudinal side rails; and
    (g) means for mounting said right and left side rails to the cross members of said stanchions.

2. The utility rack of claim 1, wherein each of the right and left side rails is substantially in the vertical plane defined by the means for mounting the respective leg of the front stanchion and the means for mounting the respective leg of the rear stanchion when it is in its extended position.

3. The utility rack of claim 1, wherein the front and rear stanchions are of substantially the same size, shape, and construction, and wherein each of the right and left legs rises vertically from the floor until adjacent the gunwale of the respective side wall, then bows outboard over said gunwale, then inclines inboard to a point adjacent the respective outboard upper portion of the cab, where it joins the cross member of the respective front or rear stanchion.

4. The utility rack of claim 1, wherein the respective cross member of each of the front and rear stanchions further comprises a telescoping member, whereby the separation between the right and left legs of the respective stanchion may be adjusted to fit the bed.

5. The utility rack of claim 1, wherein each of the respective right and left side rails comprises:
    (a) a front member;
    (b) a rear member;
    (c) hinge means joining the front member and the rear member; and
    (d) a lock means for releasably locking said hinge means;
whereby said front and rear members may be locked into a rigid longitudinal rail, or may be unlocked and collapsed.

6. The utility rack of claim 5, wherein each of the respective right and left side rails defines a smooth upper surface common to its respective front member, rear member, side hinge, and lock means.

7. The utility rack of claim 1, wherein the means for mounting the legs of the respective front and rear stanchions to the floor comprises:
    (a) right and left front mounting plates, the bottom side of each being bolted to the floor of the bed and the top side of each including two mounting members, one of which is welded to the respective leg of the front stanchion, and the other of which penetrates, and is bolted to, the respective leg of the rear stanchion when the rear stanchion is in its proximate position;
    (b) right and left front brackets, each of which is bolted to the respective leg of the front stanchion and is vertically pinned to the respective side wall through the gunwale thereof;
    (c) right and left rear mounting plates, the bottom side of each being bolted to the floor of the bed and the top side of each including a mounting member which penetrates, and is bolted to, the respective leg of the rear stanchion when the rear stanchion is in its extended position; and
    (d) right and left rear brackets, each of which is bolted to the respective leg of the rear stanchion and is vertically pinned to the respective side wall through the gunwale thereof.

8. A utility rack for a pickup truck, the truck having a cab and a bed disposed rearward of the cab, the bed having a floor, a lateral front wall, right and left longitudinal side walls, and a rear tailgate, said rack comprising:
  (a) a tubular front stanchion shaped generally in the form of an inverted "U", and having right and left legs, each rising vertically from the floor until adjacent the gunwale of the respective side wall, then bowing outboard over the gunwale, then inclining inboard to a point adjacent the outboard upper portion of the cab, where it joins a cross member, which includes a telescoping member;
  (b) a tubular rear stanchion of substantially the same size, shape, and construction as the front stanchion;
  (c) right and left front mounting plates, the bottom side of each being bolted to the floor of the bed adjacent the intersection of the front wall with the respective side wall and the top side of each including two mounting members, on of which is welded to the respective leg of the front stanchion, and the other of which is adjacent, but behind, the first mounting member, and which penetrates, and is bolted to, the respective leg of the rear stanchion when the rear stanchion is in its proximate position;
  (d) right and left front brackets, each of which is bolted to the respective leg of the front stanchion and is vertically pinned to the respective side wall through the gunwale thereof;
  (e) right and left rear mounting plates, the bottom side of each being bolted to the floor of the bed adjacent the intersection of the tailgate with the respective side wall and the top side of each including a mounting member which penetrates, and is bolted to, the respective leg of the rear stanchion when the rear stanchion is in its extended position;
  (f) right and left rear brackets, each of which is bolted to the respective leg of the rear stanchion and is vertically pinned to the respective side wall through the gunwale thereof;
  (g) right and left longitudinal side rails,
    each being substantially in the vertical plane defined by the respective front and rear mounting plates,
    each including a front member, a rear member, a side hinge joining the front member and the rear member, and lock means for releasably locking said side hinge, and
    each defining smooth upper surfaces common to their respective front members, rear members, side hinges, and lock means; and
  (h) means for mounting said right and left side rails to the cross members of said stanchions.

9. The utility rack of claim 8,
wherein the right and left side rails are mounted to stanchions by stanchion hinge means which allow of the front and rear members in a vertical longitudinal plane, and which are mounted sufficiently inboard of the respective leg that, in the collapsed configuration, the front and rear members nest between the legs of the stanchions, and
wherein the side hinge means allows rotation of the respective front and rear members in a vertical longitudinal plane;
whereby the front and rear members may be rotated between
  an extended configuration, when the rear stanchion is in its extended position, in which the front and rear members extend horizontally from the cross members of the stanchions, and
  a collapsed configuration, when the rear stanchion is in its proximate position, in which the front and rear members extend vertically downward from the cross members of the stanchions.

10. The utility rack of claim 9, further comprising:
(a) longitudinal right and left over-cab rails,
  each of which is mounted to the cross member of the front stanchion, inboard of the respective side rail, by a respective over-cab hinge means which allows rotation of the over-cab rail in a vertical longitudinal plane,
  each of which, in an extended configuration, extends forwardly from the cross member of the front stanchion adjacent its intersection with the respective front leg, and
  each of which, in a collapsed configuration, extends vertically downwardly from the cross member of the front stanchion adjacent its intersection with the respective front leg; and
(b) an over-cab cross member mounted to, and extending between, the ends of the over-cab rails distal from the cross member of the front stanchion, the over-cab cross member being adjustable by telescoping means.

11. The utility rack of claim 10,
wherein
  the right and left over-cab rails each further comprises a respective over-cab rail stop mounted on an underside of the end of the over-cab rail adjacent the cross member of the front stanchion,
  the right and left side rails each further comprises a respective side rail stop mounted on the underside of the end of the side rail adjacent the cross member of the front stanchion, and
  each of the respective over-cab and side rail stops includes a bolt alignment hole in alignment with the bolt alignment hole of the other,
whereby, when the over-cab and side rails are in their extended configuration,
  each respective side rail stop engages the respective over-cab rail stop and thereby maintains the over-cab rails in said configuration, and
  each respective side rail stop may be bolted to the respective over-cab rail stop through their respective bolt alignment holes.

12. The utility rack of claim 11,
wherein the rear stanchion's cross member further comprises vertical right and left stanchion bolt alignment holes extending therethrough, each of which is above and aligned with the respective over-cab rail stop bolt alignment hole when the rear stanchion is in its proximate position and the respective over-cab rail is in its collapsed configuration,
whereby the rear stanchion and the over-cab rails may be bolted together when the rear stanchion is in its proximate position and the respective over-cab rail is in its collapsed configuration, thereby securely retaining the over-cab rails in that configuration.

13. The utility rack of claim 10,
wherein the left and right, front and rear, stanchion hinge means mounting the respective side rail member to the respective stanchion each further comprises a member stop on the member and a stanchion stop on the stanchion, the front stanchion stops each engaging the respective front member stop and preventing said respective front member from rotating in front of the front stanchion, and the rear stanchion stops each engaging the respective rear member stop and preventing said respective rear member from rotating to the rear of the rear stanchion, whereby the side rails, when collapsed and nesting between the legs of the collapsed stanchions, are prevented from swinging out of the plane of the stanchions.

14. The utility rack of claim 8, wherein the right and left side rails are removably mounted to the cross members of the stanchions, and the right and left side hinges allow rotation of the respective front and rear members in a horizontal plane;

whereby the side rails may be moved between an extended configuration, when the rear stanchion is in its extended position, in which the respective front and rear members are mounted to the cross members of the stanchions, and a collapsed configuration, when the rear stanchion is in its proximate position, in which the respective front and rear members are removed from the stanchions, folded along the respective side hinge, and placed in a storage location.

15. The utility rack of claim 14, wherein the front members of the right and left side rails continue forward into respective right and left over-cab rails, the right and left over-cab rails terminate in respective hinges at their forward ends, each hinge mounting a respective over-cab cross member, each over-cab cross member having an outboard end and an inboard end, the respective hinge allowing horizontal rotation of the respective over-cab cross member around its outboard end, and the inboard end of the respective over-cab cross member being releasably attached by a telescoping over-cab attachment means to the inboard end of the opposite over-cab cross member;

whereby respective right and left over-cab cross members may be rotated between an extended configuration, in which each over-cab cross member extends inboardly from the front end of the respective over-cab rail and is attached, by its inboard end, to the inboard end of the opposite over-cab cross member, and a collapsed configuration, in which each over-cab cross member extends backward from the front end of, and is parallel to, the respective over-cab rail, and in which the inboard end of the respective over-cab cross member abuts the rear end of the respective side rail's rear member.

16. The apparatus of claim 1, wherein each of said side rails is collapsible and comprises front and rear portions, and means for releasably connecting said front and rear portions into a rigid longitudinal rail.

* * * * *